United States Patent [19]

Taschler

[11] 4,325,356
[45] Apr. 20, 1982

[54] IGNITER FOR PORTABLE GAS APPLIANCES

[76] Inventor: Felix Taschler, Triesterstr. 35, A 2620 Neunkirchen, Austria

[21] Appl. No.: 136,925

[22] Filed: Apr. 3, 1980

[30] Foreign Application Priority Data

Apr. 9, 1979 [AT] Austria ................................ 2637/79

[51] Int. Cl.³ ............................................. B23K 3/02
[52] U.S. Cl. ................................... 126/413; 431/263
[58] Field of Search .............. 126/401, 403, 406, 413, 126/229–233; 431/263

[56] References Cited

U.S. PATENT DOCUMENTS 3,486,498 12/1969 Taschler .............................. 431/263

FOREIGN PATENT DOCUMENTS 336981 6/1977 Austria .
1903764 9/1970 Fed. Rep. of Germany ...... 126/413

*Primary Examiner*—Carroll B. Dority, Jr.
*Attorney, Agent, or Firm*—Karl F. Ross

[57] ABSTRACT

An igniting system for the burner of a portable gas appliance, e.g. a gas-fired soldering iron comprises a duct running from a mixing nozzle at which air is mixed with the gas, to the mouth from which a torch flame emerges. A chamber communicates with this tube for igniting the mixture ahead of the mouth. A piezoelectric spark generator is provided with an electrode in this chamber to generate the spark which ignites the gas mixture in the chamber and hence the tube.

5 Claims, 4 Drawing Figures

IGNITER FOR PORTABLE GAS APPLIANCES

FIELD OF THE INVENTION

My present invention relates to igniters for the flames of portable gas appliances and, more particularly, to torches and like portable gas appliances, e.g. of the type used to heat industrial soldering irons.

BACKGROUND OF THE INVENTION

In Austrian Pat. No. 286,072 there is described a portable gas appliance in the form of a torch-heated propane gas soldering iron with an igniter which produces a torch-like flame at the mouth of a burner, this flame being trained upon the soldering iron head to heat the latter to a temperature at least sufficient to melt solder.

The flame is generated by a tubular burner mouth ahead of which is provided a mixing nozzle supplied with the propane gas by a feed tube. A spark wheel igniter is used to produce the spark which ignites the gas mixture to form the flame.

This igniter fires a branched stream of the gas mixture which, in turn, causes the ignition of the main stream. The ignition thus occurs upstream of the nozzle.

Experience with this type of ignition system has shown that it is relatively expensive to fabricate and is not always completely reliable or satisfactory.

OBJECTS OF THE INVENTION

It is the principal object of the present invention to provide an improved portable gas appliance in which disadvantages of earlier systems are avoided.

Another object of this invention is to provide an igniter system for a portable gas appliance which is more reliable than earlier system and which can be fabricated at low cost.

Still a further object of the invention is to provide a torch igniter, especially for a flame-heated soldering iron, whereby the disadvantages of the earlier systems mentioned above can be obviated.

SUMMARY OF THE INVENTION

These objects and others which will become apparent hereinafter are attained, in accordance with the present invention, in a gas appliance having a mixing nozzle at which the gas is combined with air, a tube connecting this nozzle to a tubular burner mouth, and a chamber opening into this tube downstream of the nozzle but upstream of the burner mouth.

According to a feature of the invention, therefore, the chamber which communicates with the tube, can open into the latter through a bore or orifice downstream of the nozzle and can receive a small quantity of the ignitable mixture.

A piezoelectric spark generator has an electrode disposed in this chamber for generating a spark to ignite the gas mixture therein, the resulting flame front being transmitted to the main flow of the gas mixture traversing the tube.

In the best mode application of the present invention, a torch serves to heat a soldering iron head or body, i.e. the torch flame is trained on this body which usually consists of copper and can be held by a rod or bar on the appliance whose nozzle, as described, can be disposed in the handle. In this construction, the appliance is formed with a holder in which the rod can be locked immediately adjacent the handle and ahead of the nozzle but upstream of the torch mouth, along the tube, preferably the ignition chamber is provided in the holder itself or downstream of the holder in the direction of gas flow. Advantageously the chamber-forming structure forms part of or is mechanically connected to the holder.

When the chamber is formed directly in the holder, the latter may be provided with a bore forming part of the main tube or duct traversed by the gas mixture as well as with the transverse bore or orifice connecting the chamber and the main flow bore of the holder. This passage is inclined to the main bore in the direction of flow of the gas.

According to another feature of the invention, the chamber is formed by a member which can be set into the holder or mounted on the tube and which can be composed in part or entirely of heat-resistant electrically insulating synthetic resin or another refractory material. It has been found to be advantageous to shape this chamber in semicylindrical form and in all embodiments, the ignition chamber should be gas-tight against the ambient atmosphere.

An important advantage of the system of the present invention is that it permits the ignition chamber to be relatively small, i.e. to have a minimum volume but nevertheless to reliably ignite the main flow of the gas mixture in the tube or main bore. The result is surprising in part because, notwithstanding the small volume of the chamber and the fact that a generally static gas is accumulated therein, the initial operation of the torch results in the development of an ignitable gas mixture in the chamber so that the aforementioned flame front can develop to ignite the main stream independently of its volume rate of flow or velocity. This appears to account for the increased reliability of ignition and greater ease in handling.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
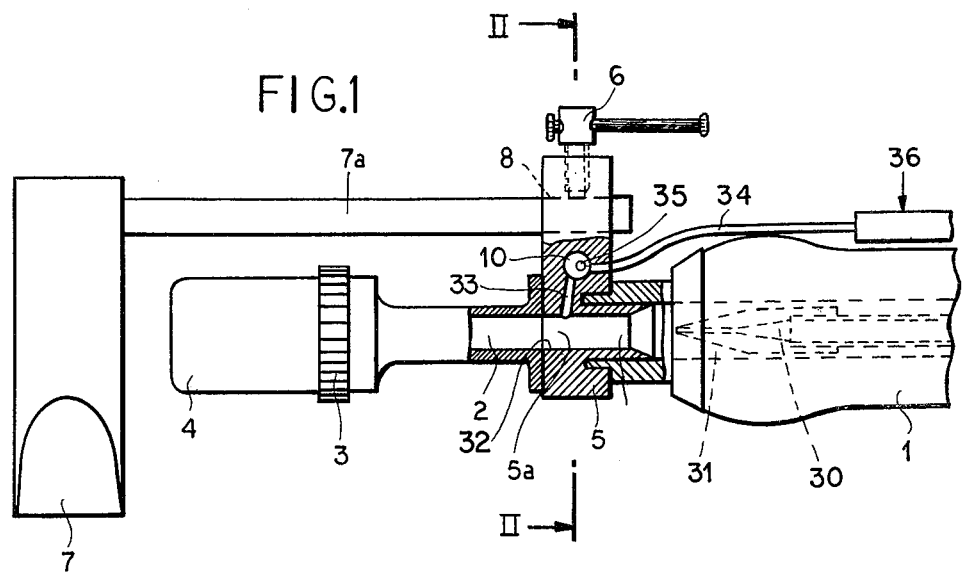
FIG. 1 is an elevational view, partially in axial cross section, illustrating a propane soldering iron provided with an ignition system according to the invention.
Figure 2:
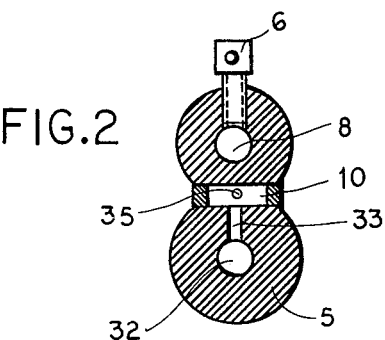
FIG. 2 is a cross-sectional view taken along the line II—II of FIG. 1.

In the accompanying drawing, for the two embodiments, identical reference numerals have been used to identify structurally similar or identically functioning parts.

Furthermore, while the principles of the present invention are deemed to be particularly applicable to gas-fired soldering irons and such appliances will be specifically described, the invention is also applicable to other propane or like gas torches and similar appliances in which the device or object to be heated is retained in a holder on the torch.

In FIG. 1, I have shown a soldering iron in which the copper head 7 is heated by a torch-like flame trained thereon from a burner mouth 4 and is carried by a rod or bar 7a which is releasably and adjustably mounted in a holder. The soldering iron structure has not been shown in FIG. 3.

The torch portion of the appliance comprises a handle or grip 1 which is formed internally with the mixing nozzle as will be described below and which carries the burner head. The burner head comprises a tube 2 forming a passage for the combustible gas mixture and which is connected with the tubular mouthpiece 4 of the torch by a nozzle insert 3, these parts being threadly interconnected in any conventional manner so that one or another of them can be readily cleaned or replaced.

Between the tube 2 and the handle 1, there is provided the holder 5 which can also be threaded into place and can be formed with a bore 5a aligned with the tube 2 to constitute therewith the main flow passage for the ignitible mixture. The holder 5 is provided with a clamp screw 6 to lock the rod 7a in place in a bore 8 extending parallel to the axis of the tube 2.

The bore 5a likewise runs parallel to the bore 8 and forms a mixing chamber which has been represented at 32.

Below the bore 8, a further bore 10 is provided at right angles to the axes of the bores 8 and 5a, both ends of the bore 10 being sealed against the atmosphere by screw-plugs not shown. This bore 10 forms the ignition chamber.

The handle 1 is provided with the nozzle 30 whose axis coincides with the axis of tube 2. Around the conically convergent end of nozzle 30, there is formed an annular passage 31 which communicates with the atmosphere and allows atmospheric air to mix with the gas to form the ignitable mixture.

The mixture become practically homogeneous in the mixing chamber 32 formed immediately downstream of the nozzle 30 as a result of the turbulence within the gas.

A bore 33 communicates between this zone in which mixing is complete and the ignition chamber 10, the bore 33 being inclined to the axis of tube 2 in the direction of gas flow.

A conductor 34 is connected to an electrode 35 insulated from the wall of chamber 10 and energized by the piezoelectric spark generator 36 which can be of conventional design, the other electrode of the piezoelectric generator being formed by the wall of the chamber 10. When the piezoelectric generator 36 on the handle 1 is triggered, a spark is generated between the electrode 35 and the wall of the chamber 10 to ignite the mixture therein.

When the gas flow commences, air is drawn into the nozzle 30, 31 and the turbulent combination of the propane with air forms the mixture in chamber 32 which streams toward the mouth of the torch. A combustible mixture readily forms in the chamber notwithstanding the fact that it is under static conditions and operation of the spark generator 37 produces the spark which ignites the flame front in chamber 10. The flame front is communicated via passage 33 to the combustible mixture in tube 2 and is swept by the main flow of this mixture to the mouth 4 to provide the torch-like flame to heat the soldering iron head 7.

Figure 4:
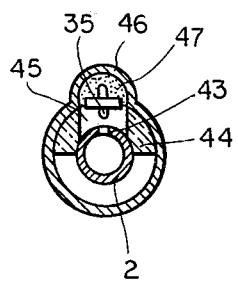
FIG. 4 is a cross-sectional view taken along the line IV—IV of FIG. 3.
Figure 3:
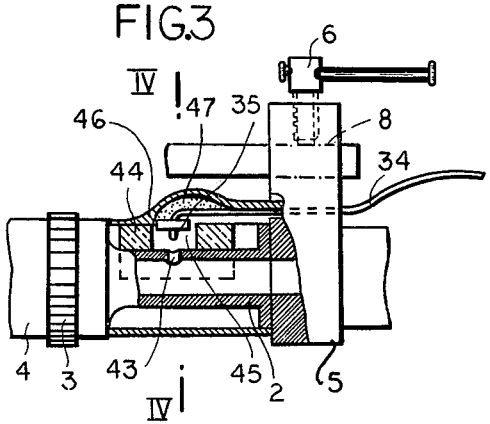
FIG. 3 is a fragmentary elevational view, partially in section illustrating the best mode of the embodiment of the ignition system of the invention.

In the embodiment of FIGS. 3 and 4, which differs only in the construction of the ignition chamber, the connecting passage between the ignition chamber and the tube 2 is formed by an orifice 43 in the upper portion of this tube. Around and above this orifice, a semicylindrical body 44 is provided to define the ignition chamber, the body 44 being composed of a refractory electrically insulating synthetic resin and has a cylindrical opening 45 aligned with the orifice 43.

This portion is covered by a cap 46 which hermetically seals the space 45 and receives at 47 the electrode 35 connected as described by line 34 to the piezoelectric generator.

In this embodiment as well, firing of the mixture in chamber 45 is transmitted via orifice 43 to the main gas flow, the spark jumping between the electrode 35 and the wall of tube 2. The cap 46 may have the space 47 filled with a refractory cement to hold the electrode in place. The cap may be mounted directly on the holder 35 as shown.

I claim:

1. A portable gas appliance comprising:
   a mixing nozzle connected to a source of a combustible gas and provided with an air source for forming an ignitable gas mixture downstream of said nozzle;
   a tube forming a main gas flow passage extending axially from said nozzle for conducting said mixture;
   a tubular burner mouth formed on said tube at an end thereof remote from said nozzle and constructed to produce a torch-like flame;
   means forming an ignition chamber laterally offset from said passage and communicating therewith at a location downstream of said nozzle but upstream of said mouth whereby a portion of the ignitable mixture traversing said passage forms in said chamber
   ignition means including an electrode extending into said chamber for firing said portion of said ignitable mixture whereby the firing of said portion is transmitted to the remainder of the ignitable mixture in said passage;
   a handle, said nozzle being formed in said handle;
   a holder disposed adjacent said handle; and means for adjustably mounting a soldering iron on said holder whereby a head of said iron is disposed in the effective region of said flame ahead of said mouth, said chamber being formed by a semicylindrical electrically insulating and heat-resistant body disposed on said tube and formed with an opening, said tube being provided with an orifice registering with said opening and communicating with the chamber defined therein.

2. The appliance defined in claim 1, further comprising a cap closing said openings and covering said body, said cap being formed as a holder for said electrode.

3. The appliance defined in claim 2 wherein said cap sealingly engages said body and said body sealingly engages said tube.

4. The appliance defined in claim 1 wherein said ignition means is a piezoelectric spark generator mounted on said handle.

5. The appliance defined in claim 4, further comprising means for hermetically sealing said chamber against the atmosphere.

* * * * *